(12) United States Patent
Maier

(10) Patent No.: US 10,337,396 B2
(45) Date of Patent: Jul. 2, 2019

(54) PRECHAMBER ASSEMBLY FOR INTERNAL COMBUSTION ENGINE

(71) Applicant: Caterpillar Energy Solutions GmbH, Mannheim (DE)

(72) Inventor: Thomas Maier, Ladenburg (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 132 days.

(21) Appl. No.: 15/374,297

(22) Filed: Dec. 9, 2016

(65) Prior Publication Data

US 2017/0167357 A1    Jun. 15, 2017

(30) Foreign Application Priority Data

Dec. 14, 2015 (GB) .................................. 1521939.7

(51) Int. Cl.
| | |
|---|---|
| *F01P 3/16* | (2006.01) |
| *F02B 19/10* | (2006.01) |
| *F02F 1/40* | (2006.01) |
| *F02B 19/08* | (2006.01) |
| *F02B 19/12* | (2006.01) |

(52) U.S. Cl.
CPC ............ *F02B 19/1009* (2013.01); *F01P 3/16* (2013.01); *F02B 19/08* (2013.01); *F02B 19/12* (2013.01); *F02F 1/40* (2013.01); *F02B 19/1019* (2013.01); *Y02T 10/125* (2013.01)

(58) Field of Classification Search
CPC ...... F02B 19/1009; F02B 19/08; F02B 19/12; F02B 19/1019; F01P 3/16; F02F 1/40; Y02T 10/125

USPC .......................................................... 123/254
See application file for complete search history.

(56) References Cited

U.S. PATENT DOCUMENTS

| | | | | |
|---|---|---|---|---|
| 5,662,082 | A | * | 9/1997 | Black .................. F02B 19/1009 |
| | | | | 123/254 |
| 8,757,127 | B2 | | 6/2014 | Ishida et al. |
| 2002/0104507 | A1 | * | 8/2002 | Riggs ...................... F02B 19/12 |
| | | | | 123/266 |

(Continued)

FOREIGN PATENT DOCUMENTS

| | | |
|---|---|---|
| DE | 1806773 A1 | 6/1970 |
| JP | 05-306649 | 11/1993 |

(Continued)

OTHER PUBLICATIONS

GB Search Report dated Jun. 3, 2016, issued in GB 1521939.7 (1 page).

*Primary Examiner* — Joseph J Dallo
*Assistant Examiner* — Yi-Kai Wang

(57) ABSTRACT

A prechamber assembly for an internal combustion engine is disclosed. The prechamber assembly may have a prechamber housing with a first prechamber housing portion and a second prechamber housing portion. The first prechamber housing portion and the second prechamber housing portion may define a prechamber volume. The prechamber assembly may also have a cooling system. The cooling system may be configured to cool at least one of the first prechamber housing portion and the second prechamber housing portion based on a flow of a cooling fluid through the cooling system. The cooling system may have at least one cooling channel formed within the prechamber housing.

19 Claims, 8 Drawing Sheets

(56) References Cited

U.S. PATENT DOCUMENTS

| | | | | |
|---|---|---|---|---|
| 2015/0083070 A1* | 3/2015 | Becker | ............... | F02F 1/40 |
| | | | | 123/254 |
| 2015/0322892 A1* | 11/2015 | Whitmore | ............ | F02K 9/94 |
| | | | | 60/251 |
| 2016/0195035 A1* | 7/2016 | Poschl | ............... | F01P 3/14 |
| | | | | 123/41.77 |
| 2017/0009989 A1* | 1/2017 | Clemen | ............. | B23P 15/00 |

FOREIGN PATENT DOCUMENTS

| JP | 07-091314 | 4/1995 |
|---|---|---|
| JP | 2001-132603 | 5/2001 |
| JP | 2008-267311 | 11/2008 |
| JP | 2012-047144 | 3/2012 |

\* cited by examiner

PRECHAMBER ASSEMBLY FOR INTERNAL COMBUSTION ENGINE

CLAIM FOR PRIORITY

This application claims benefit of priority of United Kingdom Patent Application No. GB 1521939.7, filed Dec, 14, 2015, which is incorporated herein by reference.

TECHNICAL FIELD

The present disclosure relates to a prechamber assembly, and more particularly to a cooling system associated with a prechamber assembly for an internal combustion engine.

BACKGROUND

Large-bore, lean-operating gas engines generally include a prechamber assembly in order to ensure ignition process in the engine. The prechamber assembly includes a prechamber volume, which is in fluid communication with a main combustion chamber of the engine via a number of small orifices. A spark plug associated with the prechamber assembly ignites a mixture of gaseous fuel and air present in the prechamber volume. Ignition of the mixture of gaseous fuel and air creates a front of burning fuel which is introduced in the main combustion chamber through the orifices. The prechamber assembly is subjected to high temperatures, especially where turbochargers are employed and engines are operating at high power density levels.

U.S. Pat. No. 8,757,127, hereinafter referred to as the '127 patent, describes a check valve structure capable of preventing soot accumulation in a check valve arranged in a prechamber assembly due to incomplete combustion of fuel gas and preventing malfunction of the check valve for a gas engine having a prechamber assembly with a spark plug. An arrangement for supplying fuel gas to the prechamber volume has multiple bore-cooling holes disposed around the spark plug for cooling a gasket formed in a mounting hardware piece, the holes having a lateral bore-cooling hole, and a lateral bore-cooling hole with the gasket therebetween. Each of the holes further has multiple bore-cooling holes parallel to the center axis of the spark plug. However, U.S. Pat. No. 8,757,127 does not describe a design that allows cooling of various portions of the prechamber assembly that are subjected to high temperatures during engine operation.

SUMMARY OF THE DISCLOSURE

In one aspect of the present disclosure, a prechamber assembly for an internal combustion engine is provided. The prechamber assembly includes a prechamber housing. The prechamber housing also includes a first prechamber housing portion. The prechamber housing further includes a second prechamber housing portion. The first prechamber housing portion and the second prechamber housing portion define a prechamber volume. The prechamber further includes a cooling system configured to cool at least one of the first prechamber housing portion and the second prechamber housing portion, based on a flow of a cooling fluid through the cooling system. The cooling system includes at least one cooling channel formed within the prechamber housing.

In another aspect of the present disclosure, an engine is provided. The engine includes a cylinder block defining at least one main combustion chamber. The engine also includes a cylinder head positioned on the cylinder block. The engine further includes at least one prechamber assembly with a prechamber volume in fluid communication with the at least one main combustion chamber. The prechamber assembly includes a prechamber housing. The prechamber housing includes a first prechamber housing portion. The prechamber housing further includes a second prechamber housing portion. The first prechamber housing portion and the second prechamber housing portion define a prechamber volume. The prechamber assembly further includes a cooling system configured to cool at least one of the first prechamber housing portion and the second prechamber housing portion, based on a flow of a cooling fluid through the cooling system. The cooling system includes at least one cooling channel formed within the prechamber housing.

Other features and aspects of this disclosure will be apparent from the following description and the accompanying drawings.

DETAILED DESCRIPTION

Figure 1:
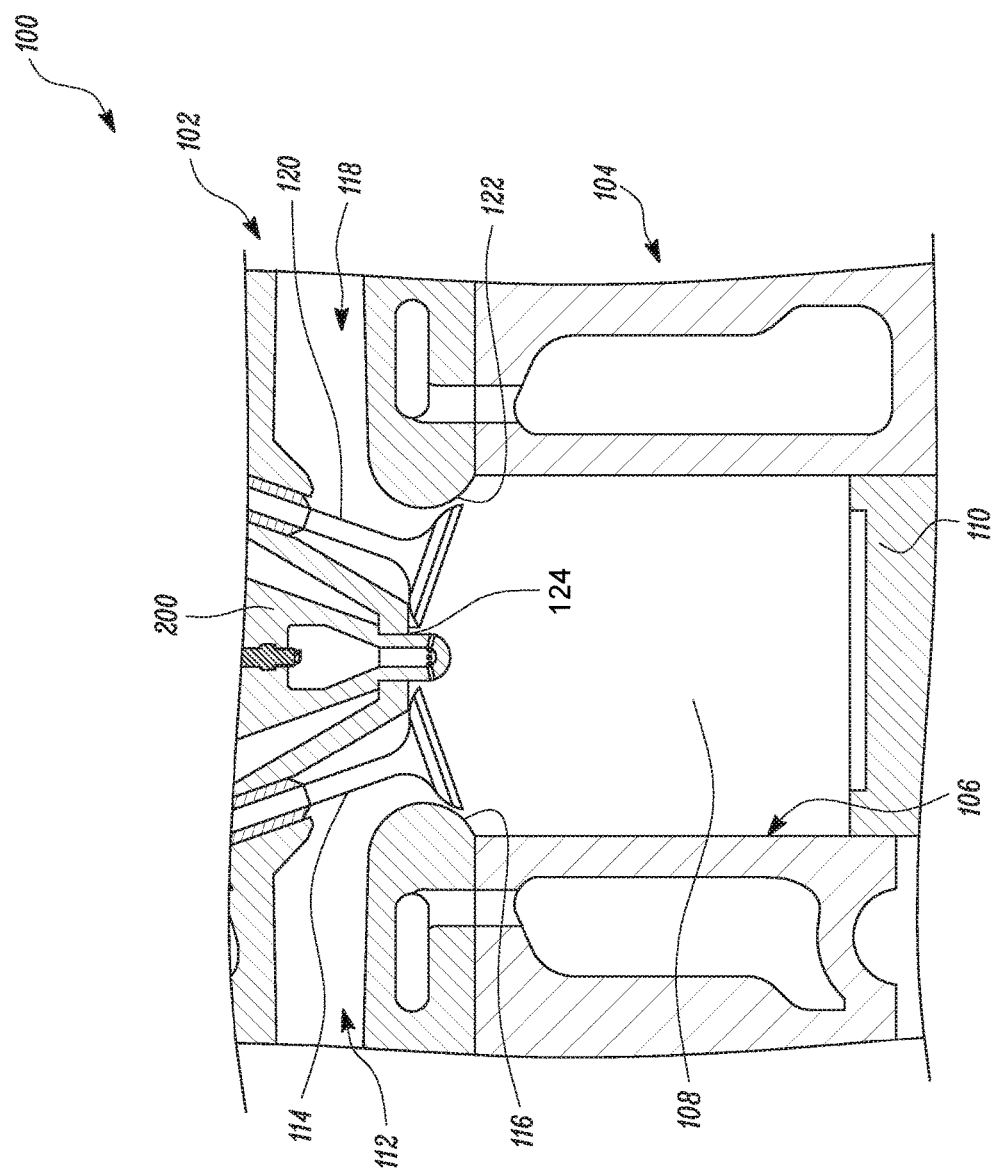
FIG. 1 is a cross-sectional view of a portion of an exemplary internal combustion (IC) engine, according to one embodiment of the present disclosure.

Wherever possible, the same reference numbers will be used throughout the drawings to refer to the same or the like parts. FIG. 1 illustrates a portion of an exemplary internal combustion (IC) engine 100, according to one embodiment of the present disclosure. The IC engine 100 is hereinafter interchangeably referred to as the engine 100. The engine 100 may be a reciprocating spark ignited engine. The engine 100 may be a single cylinder IC engine or a multi cylinder IC engine. Further, the engine 100 may be powered by any one or a combination of known liquid or gaseous fuels including, but not limited to, gasoline, diesel, natural gas, petroleum gas, bio-fuels, and the like.

The engine 100 includes a cylinder head 102 and a cylinder block 104. The cylinder head 102 is positioned on the cylinder block 104. The cylinder block 104 may include a number of cylinders 106, one of which is shown in FIG. 1. The cylinder 106 defines a main combustion chamber 108. The main combustion chamber 108 slidably accommodates a piston 110. The piston 110 may have a translatory movement within the cylinder 106. The piston 110 may be coupled to one end of a connecting rod (not shown). Another end of the connecting rod may be coupled to a crankshaft (not shown). The connecting rod may be configured to convert the translatory movement of the piston 110 to a rotary movement of the crankshaft.

An intake passage 112 is defined in the cylinder head 102. Further, an intake valve 114 is disposed within the intake passage 112. The intake valve 114 selectively opens an intake port 116 in order to introduce air in the cylinder 106 to facilitate combustion. An exhaust passage 118 is also defined in the cylinder head 102. During an exhaust stroke of the engine 100, products of combustion such as exhaust gases and residual gases, are expelled from the main combustion chamber 108 and introduced in the exhaust passage 118. An exhaust valve 120 is disposed within the exhaust passage 118. The exhaust valve 120 selectively opens an exhaust port 122 in order to expel the products of combustion from the main combustion chamber 108.

In order to ensure an ignition of an air and gaseous fuel mixture in the main combustion chamber 108 of the engine 100, a prechamber assembly 200 is associated with the engine 100. The prechamber assembly 200 is in fluid communication with the main combustion chamber 108. In the illustrated example, the prechamber assembly 200 is disposed partially in the cylinder head 102 and partially in the cylinder block 104. The prechamber assembly 200 is positioned in an aperture 124 defined in the cylinder head 102, and extends into the main combustion chamber 108. In another example, the prechamber assembly 200 may be entirely mounted in the cylinder head 102 of the engine 100. In yet another example, the prechamber assembly 200 may be mounted in the cylinder block 104 of the engine 100, without any limitations.

Figure 2:
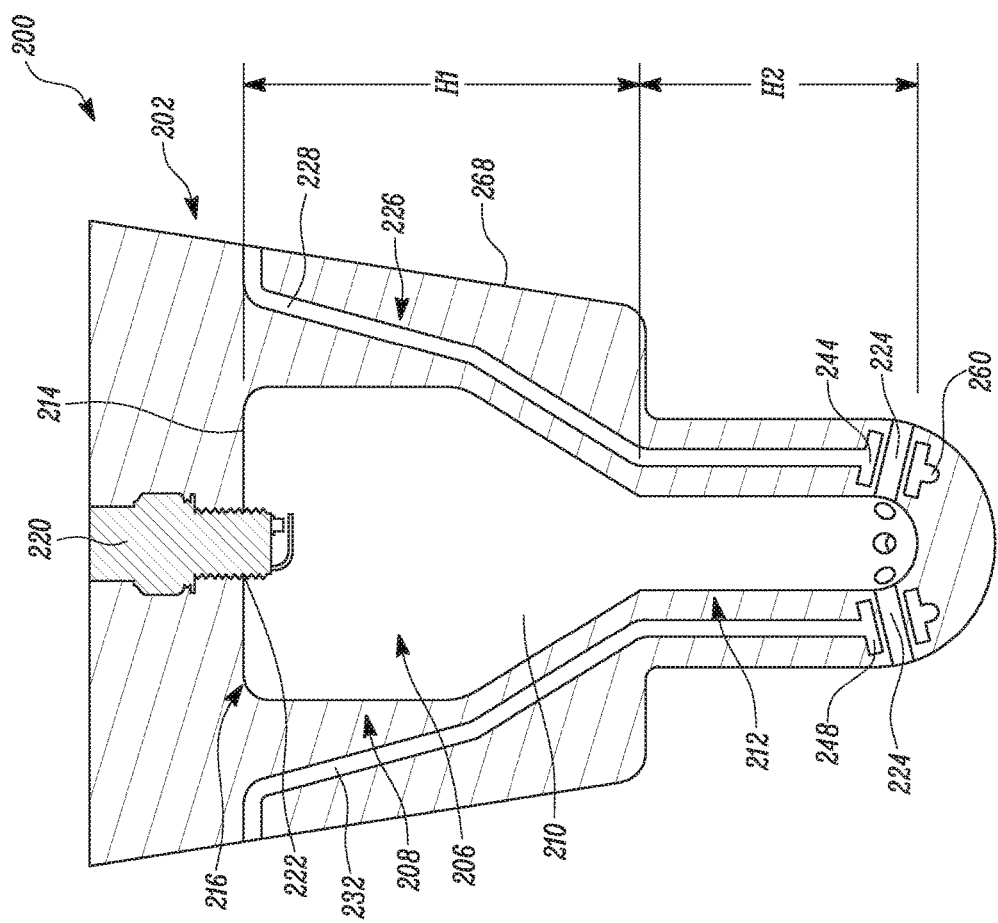
FIG. 2 is a schematic view of the prechamber assembly and the cooling system of the prechamber assembly, according to one embodiment of the present disclosure.

Referring to FIG. 2, the prechamber assembly 200 includes a prechamber housing 202. The prechamber housing 202 defines a prechamber volume 206. The prechamber assembly 200 includes a first prechamber housing portion 208. In one example, the first prechamber housing portion 208 of the prechamber assembly 200 is conical in shape. In an alternate example, the first prechamber housing portion 208 of the prechamber assembly 200 may have a cylindrical shape or any other shape, without any limitations. Further, the first prechamber housing portion 208 includes a neck portion 210 that connects the first prechamber housing portion 208 with a second prechamber housing portion 212. The first prechamber housing portion 208 extends along a first height "H1". It should be noted that a shape of the first prechamber housing portion 208 may vary from that shown in FIG. 2, without limiting the scope of the present disclosure.

The first prechamber housing portion 208 includes a first surface 214 provided at an upper end 216 of the first prechamber housing portion 208. Further, a spark plug 220 is associated with the prechamber assembly 200. A portion of the spark plug 220 is coupled to the first prechamber housing portion 208 of the prechamber assembly 200. The portion of the spark plug 220 is received within a first port 222 defined in the first surface 214. In one example, the portion of the spark plug 220 is centrally disposed in the first surface 214. The spark plug 220 ignites an air and fuel mixture present in the prechamber assembly 200, thereby producing ignited gases within the prechamber assembly 200. It should be noted that the prechamber assembly 200 may include any other ignition device known in the art, without any limitations.

The prechamber assembly 200 also includes the second prechamber housing portion 212. The second prechamber housing portion 212 is in fluid communication with the first prechamber housing portion 208. The first prechamber housing portion 208 and the second prechamber housing portion 212 together define the prechamber volume 206. In one example, the second prechamber housing portion 212 is cylindrical in shape. In an alternate example, the second prechamber housing portion 212 of the prechamber assembly 200 may have a conical shape or any other shape, without any limitations. Further, the second prechamber housing portion 212 has a uniform cross-section along a second height "H2" of the second prechamber housing portion 212. It should be noted that a shape of the second prechamber housing portion 212 may vary from that shown in FIG. 2, without limiting the scope of the present disclosure.

The prechamber housing 202 includes a passage 224. In the illustrated example, the prechamber assembly 200 includes a number of passages 224, two of which are visible in FIG. 2. The passages 224 allow fluid communication between the prechamber volume 206 of the prechamber assembly 200 and the main combustion chamber 108. It should be noted that the number of passages 224 may vary based on operational requirements. In one example, the prechamber assembly 200 may include eight passages 224. The ignited gases pass through the passages 224 and are introduced in the main combustion chamber 108 to ignite the air and fuel mixture in the main combustion chamber 108.

The prechamber assembly 200 includes a cooling system 226. A cooling fluid flowing through the cooling system 226 maintains a temperature or cools the first prechamber housing portion 208, the second prechamber housing portion 212, and/or the passages 224 of the prechamber assembly 200. The cooling fluid may include any type of a known engine coolant that flows through various components of the engine 100. The cooling system 226 will now be described in detail with reference to FIGS. 3, 4, and 5.

Figure 3:
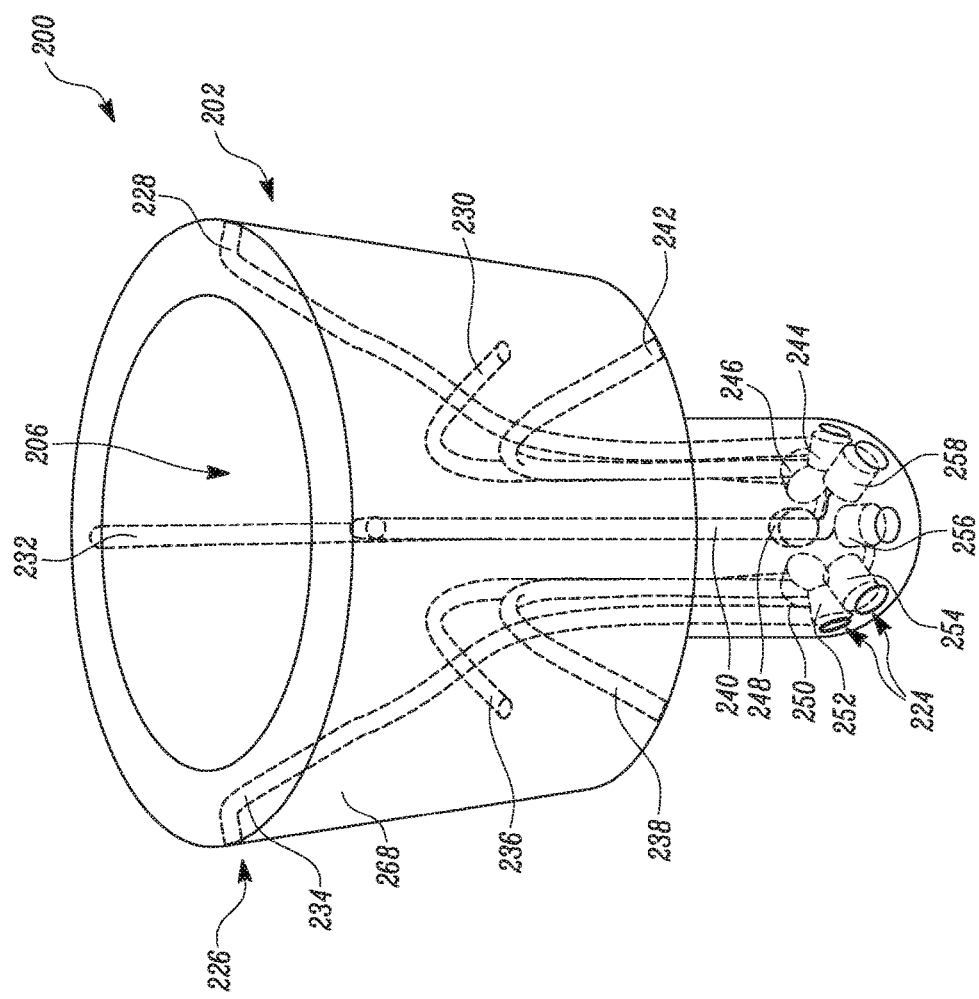
FIG. 3 illustrates a perspective view of the prechamber assembly shown in FIG. 2 having the cooling system, according to one embodiment of the present disclosure.
Figure 4:
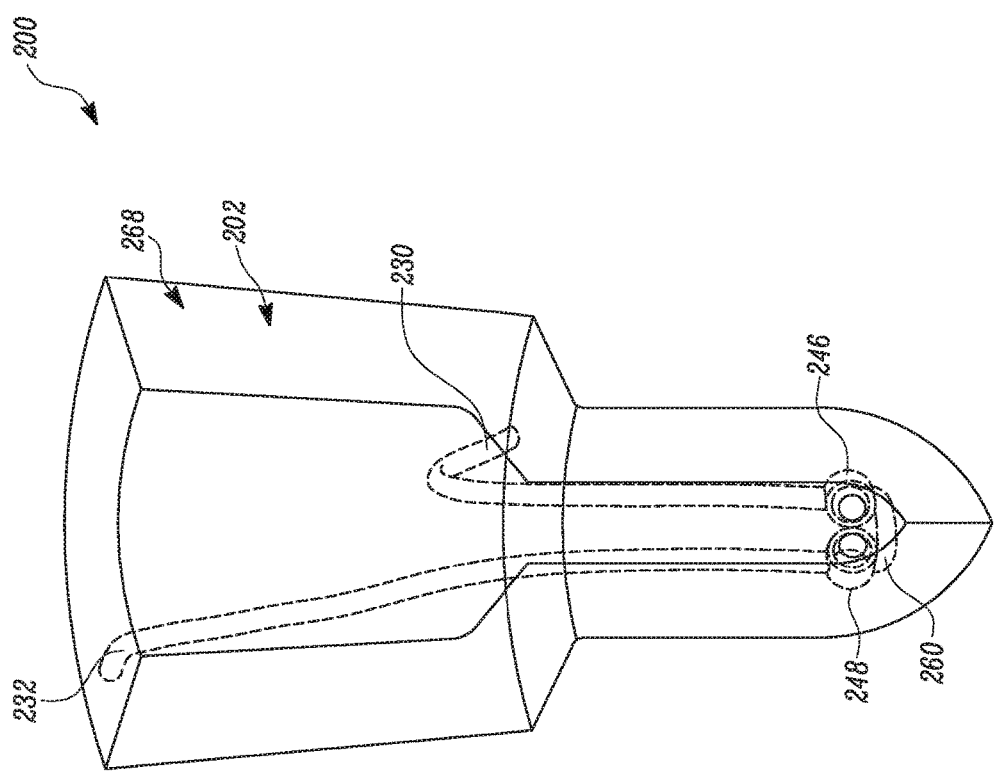
FIG. 4 is a perspective view of a portion of the prechamber assembly of FIG. 3 illustrating a pair of adjacently disposed cooling channels of the cooling system, according to one embodiment of the present disclosure.
Figure 5:
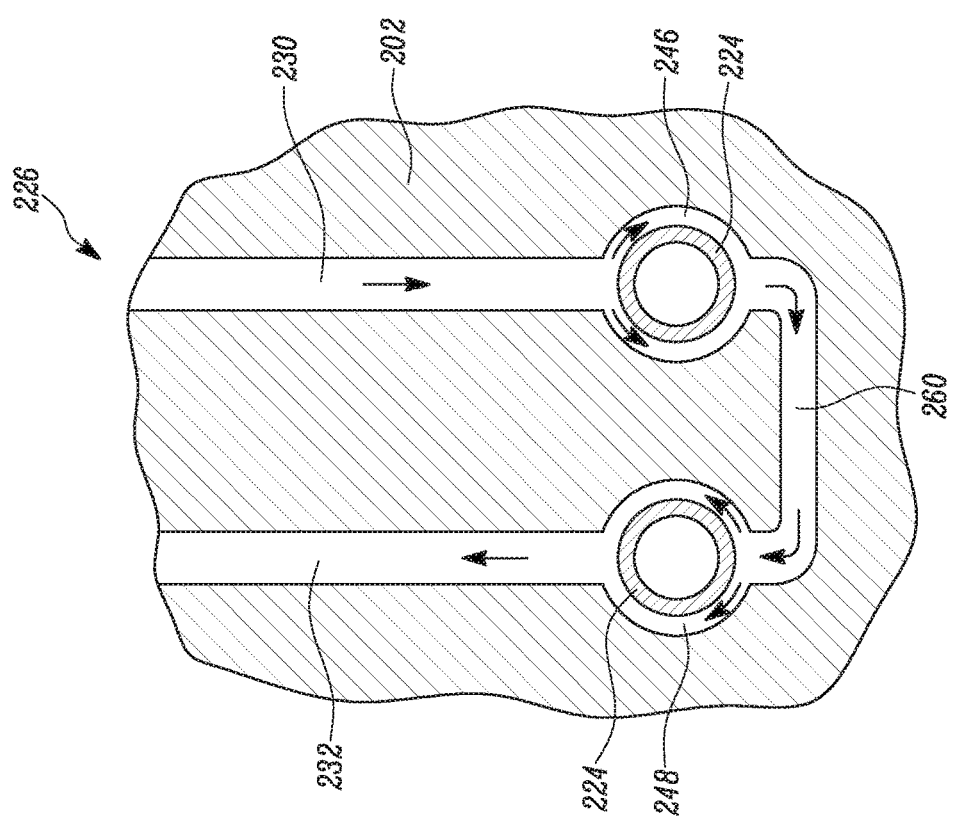
FIG. 5 is a cross-sectional view of the cooling channels shown in FIG. 4, according to one embodiment of the present disclosure.

Referring to FIGS. 3, 4, and 5, the cooling system 226 includes at least one cooling channel formed within the prechamber housing 202. In one example, the cooling channel may be partially curved. In another example, the cooling channel may have a straight configuration, without any limitations. A total number of cooling channels may vary based on an amount of cooling required and also the number of passages 224 associated with the prechamber volume 206 of the prechamber assembly 200. In one example, the total number of cooling channels corresponds to the number of passages 224 associated with the prechamber volume 206 of the prechamber assembly 200. In another example, the total number of cooling channels is less than the number of passages 224 associated with the prechamber volume 206 of the prechamber assembly 200.

In this embodiment, the cooling system 226 includes eight cooling channels 228, 230, 232, 234, 236, 238, 240, 242 corresponding to the passages 224. Each of the cooling channels 228, 230, 232, 234, 236, 238, 240, 242 includes openings positioned at an outer side 268 of the prechamber housing 202. The cooling fluid flowing through the cooling channels 228, 230, 232, 234, 236, 238, 240, 242 of the cooling system 226 is adapted to cool the prechamber assembly 200. The cooling channels 228, 230, 232, 234, 236, 238, 240, 242 extend along the first and second heights "H1", "H2" of the first prechamber housing portion 208 and the second prechamber housing portion 212, respectively.

The cooling channels 242, 230, 236, 238 are embodied as inlet cooling channels that allow an inflow of the cooling fluid in the prechamber housing 202, whereas the cooling channels 228, 232, 234, 240 are embodied as outlet cooling channels that allow an outflow of the cooling fluid from the prechamber housing 202. The cooling channels 242, 230, 236, 238 are in fluid communication with the cooling channels 228, 232, 234, 240, respectively, close to a lower end of the prechamber housing 202.

The cooling system 226 includes a number of loop portions 244, 246, 248, 250, 252, 254, 256, 258, 260. In one example, a total number of loop portions correspond to the total number of cooling channels associated with the cooling system 226. The cooling system 226 includes eight loop portions 244, 246, 248, 250, 252, 254, 256, 258, 260 corresponding to each cooling channel 228, 230, 232, 234, 236, 238, 240, 242 (see FIG. 3).

The loop portions 244, 246, 248, 250, 252, 254, 256, 258, 260 circumferentially surround the respective passages 224 extending from the prechamber volume 206. Each of the loop portions 244, 246, 248, 250, 252, 254, 256, 258, 260 includes channels formed therein to receive the cooling fluid from the respective cooling channels 228, 230, 232, 234, 236, 238, 240, 242. The loop portions 244, 246, 248, 250, 252, 254, 256, 258, 260 cool the respective passages 224 based on the flow of the cooling fluid through the channels of the loop portions 244, 246, 248, 250.

For exemplary purposes, a design of the loop portions 244, 246 associated with the cooling channels 228, 230 will now be explained in detail with reference to FIGS. 4 and 5. However, it should be noted that the description provided below is equally applicable to the cooling channels 232, 234, 236, 238, 240, 242 and the loop portions 248, 250, 252, 254, 256, 258 of the cooling system 226.

As shown in FIGS. 4 and 5, the cooling channels 228, 230 are coupled to the respective loop portion 244, 246 at a top portion thereof. Further, the loop portion 244 is in fluid communication with the adjacent loop portion 246 via a conduit 260. The loop portions 244, 246 and the conduit 260 together provide fluid communication between the cooling channels 228, 230. In one example, the cooling system 226 includes four conduits, one of which is shown in FIGS. 4 and 5. The cooling fluid received from the cooling channel 230 flows through the loop portion 246 and is introduced in the conduit 260. Further, the conduit 260 introduces the cooling fluid in the loop portion 248 and the cooling channel 232, respectively. The cooling fluid exits the prechamber housing 202 from the cooling channel 232. A flow direction of the cooling fluid is shown using arrows in FIG. 5.

Figure 6:
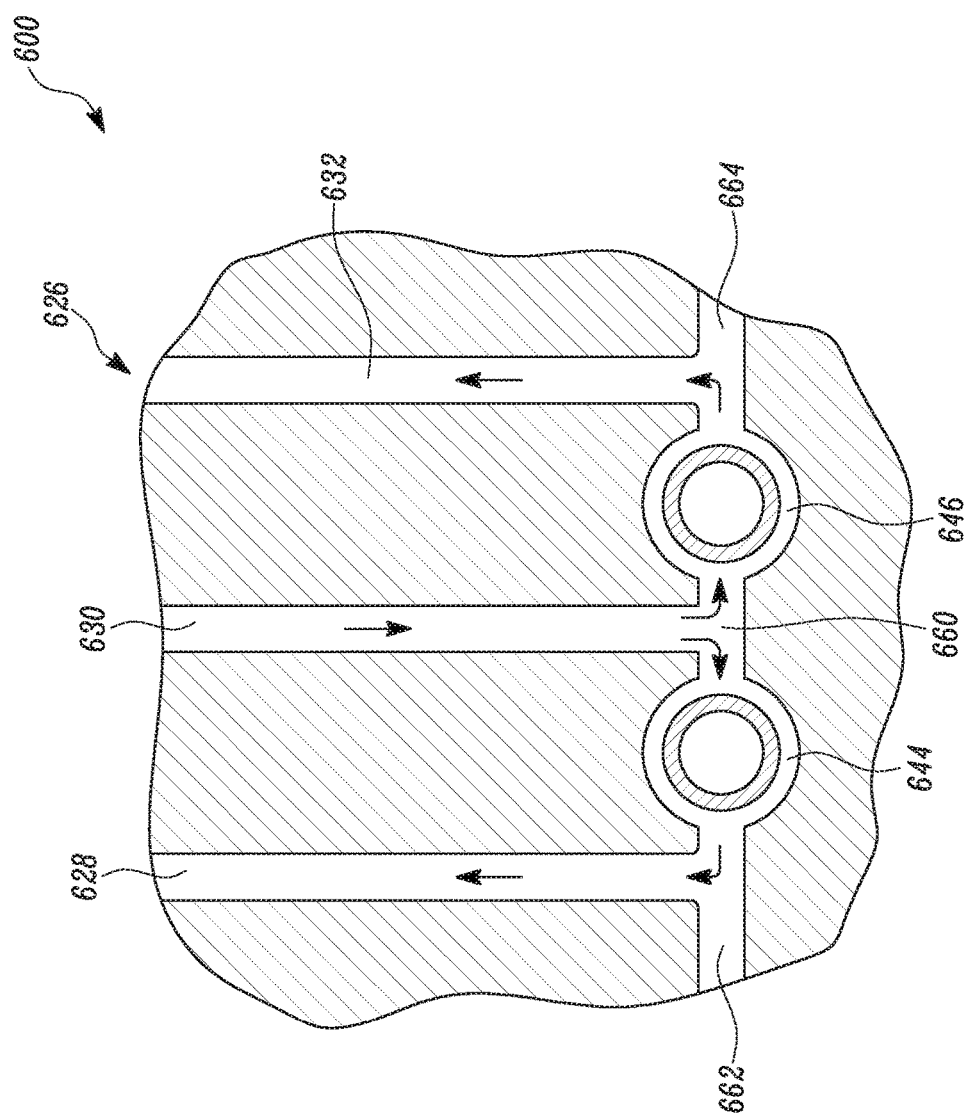
FIG. 6 is a cross-sectional view of three adjacently disposed cooling channels, according to another embodiment of the present disclosure.

FIG. 6 illustrates another embodiment of the cooling system 626 for the prechamber assembly 600. In this embodiment, the cooling channels 628, 630, 632 are coupled to a top portion of the respective conduits 660, 662, 664. Further, the cooling channels 628, 630, 632 are disposed between adjacently disposed loop portions 644, 646. The flow direction of the cooling fluid is shown using arrows in FIG. 6. The cooling fluid is received in the conduit 660 through the cooling channel 630. As shown, the cooling fluid splits and flows towards each loop portions 644, 646 from the conduit 660. Further, the cooling fluid exiting the loop portions 644, 646 is introduced in the respective cooling channels 628, 632, respectively. The cooling fluid exits the prechamber housing 602 via the cooling channels 628, 632.

Figure 7:
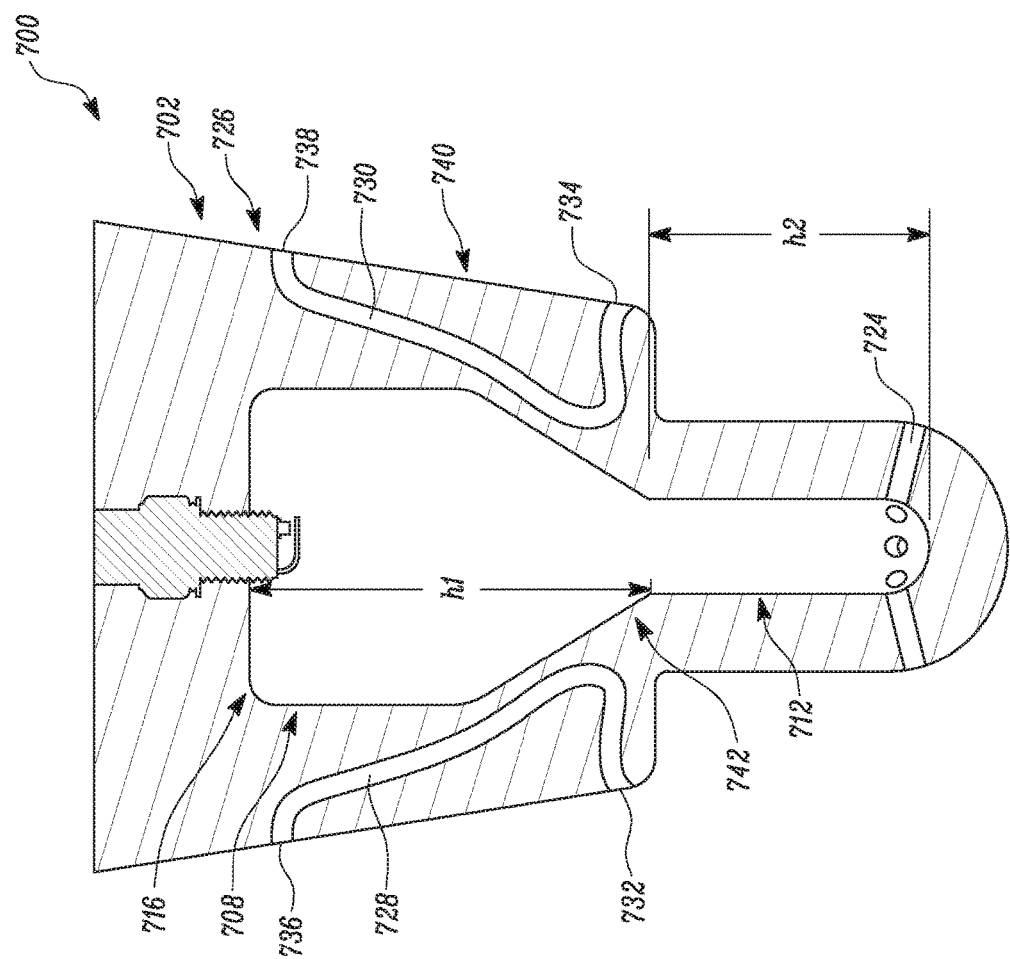
FIG. 7 is a schematic view of the prechamber assembly and the cooling system of the prechamber assembly, according to yet another embodiment of the present disclosure.

FIG. 7 illustrates another exemplary embodiment of the present disclosure where the cooling fluid flowing through the cooling channels 728, 730 of the cooling system 726 cools the first prechamber housing portion 708 of the prechamber assembly 700. In this embodiment, the total number of cooling channels associated with the cooling system 726 may be greater than the number of passages 724 associated with the prechamber assembly 700. The first prechamber housing portion 708 of the prechamber assembly 700 is cooled based on the flow of the cooling fluid through the cooling channels 728, 730. The cooling channels 728, 730 extend along the first height "h1" of the first prechamber housing portion 708. In another embodiment, the cooling channels 728, 730 may extend along the second height "h2" of the second prechamber housing portion 712. In such an embodiment, the second prechamber housing portion 712 of the prechamber assembly 700 is cooled based on the flow of the cooling fluid through the cooling channels 728, 730.

Each of the cooling channels 728, 730 includes an inlet opening 732, 734 and an outlet opening 736, 738, respectively. The inlet openings 732, 734 and the outlet openings 736, 738 are positioned at an outer side 740 of the prechamber housing 702. In one example, the inlet openings 732, 734 are positioned on the outer side 740, proximate to a lower end 742 of the first prechamber housing portion 708. Further, the outlet openings 736, 738 are positioned on the outer side 740 close to the upper end 716 of the first prechamber housing portion 708. The coolant enters the cooling channels 728, 730 from the respective inlet openings 732, 734. Further, the coolant exits the cooling channels 728, 730 from the respective outlet opening 736, 738. In another example, the inlet openings may be positioned on the outer side 740, proximate to the upper end 716 of the first prechamber housing portion 708. Further, the outlet openings may be positioned on the outer side 740 close to the lower end 742 of the first prechamber housing portion 708. In such an example, the coolant enters through the inlet openings and flows downwards to exit the cooling channels 728, 730 from the outlet openings.

Figure 8:
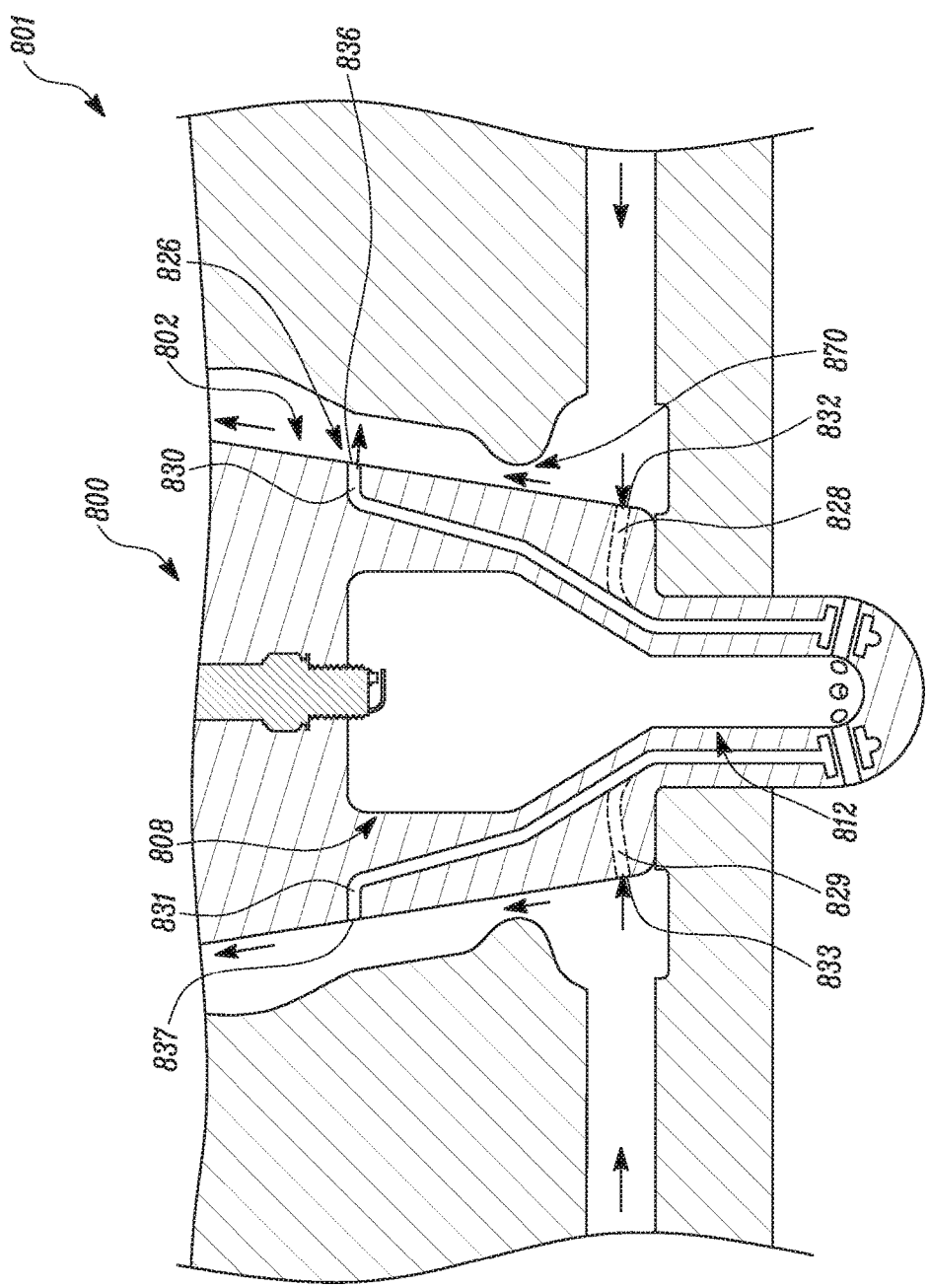
FIG. 8 is a schematic view of the prechamber assembly having a nozzle, according to one embodiment of the present disclosure.

Referring to FIG. 8, a cross-sectional view of a portion of the engine 801 having the prechamber assembly 800 is illustrated. The coolant enters the cooling channel 828, 829 of the cooling system 826 through the inlet opening 832, 833, respectively. Further, the coolant flows through the cooling channel 830, 831 and exits through the outlet opening 836, 837. The coolant flowing through the cooling channel 828, 829, 830, 831 cools the first prechamber housing portion 808 and the first prechamber housing portion 812. In one example, a nozzle 870 may be formed around the prechamber housing 802. The nozzle 870 reduces the flow around the prechamber housing 802, which in turn assists in controlling the amount of coolant flowing through the cooling channel 828, 829, 830, 831.

The prechamber assembly 200, 600, 700, 800 may be manufactured of a metal that is resistant to high temperature and high pressures. Further, the prechamber assembly 200, 600, 700, 800 may be manufactured using conventional techniques such as, for example, casting or molding. In one example, the prechamber assembly 200, 600, 700, 800 is manufactured using additive manufacturing or additive fabrication. Known additive manufacturing/fabrication processes include techniques such as, for example, 3D printing wherein material may be deposited in successive layers under the control of a computer to form the prechamber assembly 200, 600, 700, 800.

The computer controls additive fabrication equipment to deposit the successive layers according to a computer readable three dimensional model. The computer readable three dimensional models may include, for example, a digital file such as an AMF or STL file that is converted into a plurality of slices. The computer readable three dimensional model used to represent the prechamber assembly 200, 600, 700, 800 may be on a computer-readable storage medium such as, for example, a magnetic storage including floppy disk, hard disk, or magnetic tape; semiconductor storage such as Solid State Disk (SSD) or flash memory; optical disc storage; magneto-optical disc storage; or any other type of physical memory on which information or data readable by at least one processor may be stored.

The storage medium may be used in connection with commercially available 3D printers to manufacture, or fabricate, the prechamber assembly 200, 600, 700, 800. Alternatively, the computer readable three dimensional models may be transmitted electronically to the 3D printer in a streaming fashion without being permanently stored at the location of the 3D printer. In either case, the three-dimensional model constitutes a digital representation of the prechamber assembly 200, 600, 700, 800 suitable for use in manufacturing the prechamber assembly 200, 600, 700. It should be noted that the prechamber assembly 200, 600, 700, 800 may be manufactured using any additive manufacturing process or subtractive manufacturing process known in the art, without limiting the scope of the present disclosure.

INDUSTRIAL APPLICABILITY

During a compression stroke, the air and fuel mixture is pressed through the passages 224 from the main combustion chamber 108 into the prechamber volume 206. The air and fuel mixture is ignited by the spark plug 220. As the ignited air and fuel mixture expands, the ignited air and fuel mixture is pressed out of the prechamber volume 206 through the passages 224 into the main combustion chamber 108. The ignited air and fuel mixture are high in temperature. Thus, the prechamber assembly 200, 600, 700, 800 is subjected to high temperatures during engine operation. The cooling system 226, 626, 726, 826 disclosed herein, improves the prechamber assembly to cooling fluid heat transfer, thereby providing an efficient cooling of the prechamber assembly 200, 600, 700, 800.

The cooling system 226, 626, 726, 826 includes the cooling channels 228, 230, 232, 234, 236, 238, 240, 242, 628, 630, 632, 728, 730, 828, 829, 830, 831. In one embodiment, the cooling fluid flowing through the cooling channels 228, 230, 232, 234, 236, 238, 240, 242 cool each of the first prechamber housing portion 208, the second prechamber housing portion 212, and the passages 224 of the prechamber assembly 200. In another embodiment, the cooling fluid flowing through the cooling channels 728, 730, 828, 829, 830, 831 cool the first prechamber housing portion 708, 808 of the prechamber assembly 700, 800.

The cooling channels 228, 230, 232, 234, 236, 238, 240, 242, 628, 630, 632, 728, 730, 828, 829, 830, 831 and the loop portions 244, 246, 248, 250, 252, 254, 256, 258, 260, 644, 646 are easy to form within the prechamber assembly 200, 600, 700, 800. Further, the prechamber assembly 200, 600, 700, 800 may be manufactured using any additive or subtractive manufacturing process known in the art. In one example, the prechamber assembly 200, 600, 700, 800 may be manufactured using computer readable three dimensional models of the prechamber assembly 200, 600, 700, 800, without limiting the scope of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A prechamber assembly for an internal combustion engine, the prechamber assembly comprising:
   a prechamber housing with a first prechamber housing portion and a second prechamber housing portion, wherein the first prechamber housing portion and the second prechamber housing portion define a prechamber volume therein,
   a prechamber housing wall being defined between an internal surface of the prechamber housing and an external surface of the prechamber housing,
   the prechamber housing wall defining a plurality of passages therethrough, each passage of the plurality of passages extending from a passage inlet defined by the internal surface of the prechamber housing to a passage outlet defined by the external surface of the prechamber housing, the prechamber volume being in fluid communication with the external surface of the prechamber housing and a main combustion chamber of the internal combustion engine via each passage; and
   a cooling system configured to cool at least one of the first prechamber housing portion and the second prechamber housing portion, based on a flow of a cooling fluid through the cooling system, the cooling system comprising at least one cooling channel defined within the wall of the prechamber housing,
   the at least one cooling channel including a loop portion that at least partially surrounds one passage of the plurality of passages about a circumferential direction of the one passage, the circumferential direction of each passage extending circumferentially about a flow direction through each passage,
   the loop portion being configured to cool the one passage based on the flow of the cooling fluid through the cooling system,
   wherein the at least one cooling channel includes a plurality of loop portions, the loop portion being a first loop portion of the plurality of loop portions, and
   wherein the first loop portion is in fluid communication with a second loop portion of the plurality of loop portions via a conduit, the second loop portion being adjacent to the first loop portion about a circumferential direction around the prechamber housing.

2. The prechamber assembly of claim 1, wherein a portion of the at least one cooling channel extends along a first height (H1, h1) defined by the first prechamber housing portion.

3. The prechamber assembly of claim 1, wherein the at least one cooling channel extends from a cooling inlet opening to a cooling outlet opening, each of the cooling inlet opening and the cooling outlet opening being defined by the external surface of the prechamber housing.

4. The prechamber assembly of claim 1, wherein the at least one cooling channel includes a plurality of cooling channels, such that each cooling channel of the plurality of cooling channels uniquely corresponds to a passage of the plurality of passages.

5. The prechamber assembly of claim 1, wherein the at least one cooling channel includes a plurality of cooling channels, and a total number of cooling channels in the plurality of cooling channels is less than a total number of passages in the plurality of passages.

6. The prechamber assembly of claim 1, wherein the at least one cooling channel includes a plurality of cooling channels, and a total number of cooling channels is greater than a total number of passages in the plurality of passages.

7. The prechamber assembly of claim 1, wherein the prechamber assembly is manufactured using an additive manufacturing process.

8. A computer-readable three-dimensional model suitable for use in manufacturing the prechamber assembly of claim 7.

9. An engine comprising:
a cylinder block defining at least one cylinder, which defines at least one main combustion chamber therein;
a cylinder head positioned on the cylinder block; and
at least one prechamber assembly comprising:
a prechamber housing with a first prechamber housing portion and a second prechamber housing portion, wherein the first prechamber housing portion and the second prechamber housing portion define a prechamber volume therein,
a prechamber housing wall being defined between an internal surface of the prechamber housing and an external surface of the prechamber housing,
the prechamber housing wall defining a plurality of passages therethrough, each passage of the plurality of passages extending from a passage inlet defined by the internal surface of the prechamber housing to a passage outlet defined by the external surface of the prechamber housing, the prechamber volume being in fluid communication with the at least one main combustion chamber via each passage; and
a cooling system configured to cool at least one of the first prechamber housing portion and the second prechamber housing portion based on a flow of a cooling fluid through the cooling system, the cooling system comprising at least one cooling channel defined within the prechamber housing wall,
the at least one cooling channel including a loop portion that at least partially surrounds one passage of the plurality of passages about a circumferential direction of the one passage, the circumferential direction of each passage extending circumferentially about a flow direction through each passage,
the loop portion being configured to cool the one passage based on the flow of the cooling fluid through the cooling system,
wherein the at least one cooling channel includes a plurality of cooling channels, such that each cooling channel of the plurality of cooling channels uniquely corresponds to a passage of the plurality of passages.

10. The engine of claim 9, wherein the cylinder head includes an aperture defined therein, the at least one prechamber assembly being positioned within the aperture of the cylinder head.

11. The engine of claim 9, wherein a portion of the at least one cooling channel extends along a first height (H1, h1) defined by the first prechamber housing portion.

12. The engine of claim 9, wherein the at least one cooling channel extends from a cooling inlet opening to a cooling outlet opening, each of the cooling inlet opening and the cooling outlet opening being defined by the external surface of the prechamber housing.

13. The engine of claim 9, wherein the at least one cooling channel includes a plurality of loop portions, the loop portion being a first loop portion of the plurality of loop portions, and wherein the first loop portion is in fluid communication with a second loop portion of the plurality of loop portions via a conduit, the second loop portion being adjacent to the first loop portion about a circumferential direction around the prechamber housing.

14. The engine of claim 9, wherein the at least one cooling channel includes a plurality of cooling channels, such that a total number of cooling channels in the plurality of cooling channels is less than a total number of passages in the plurality of passages.

15. The engine of claim 9, wherein the at least one cooling channel includes a plurality of cooling channels, such that a total number of cooling channels in the plurality of cooling channels is greater than a total number of passages in the plurality of passages.

16. The prechamber assembly of claim 1, wherein the loop portion extends completely around the one passage about the circumferential direction of the one passage.

17. The engine of claim 9, wherein the loop portion extends completely around the one passage about the circumferential direction of the one passage.

18. The engine of claim 9, wherein the flow direction through each passage is transverse to a longitudinal direction of the at least one cylinder, the longitudinal direction of the at least one cylinder extending from the cylinder head toward the at least one main combustion chamber.

19. A prechamber assembly for an internal combustion engine, the prechamber assembly comprising:
a prechamber housing with a first prechamber housing portion and a second prechamber housing portion, wherein the first prechamber housing portion and the second prechamber housing portion define a prechamber volume therein,
a prechamber housing wall being defined between an internal surface of the prechamber housing and an external surface of the prechamber housing,
the prechamber housing wall defining a plurality of passages therethrough, each passage of the plurality of passages extending from a passage inlet defined by the internal surface of the prechamber housing to a passage outlet defined by the external surface of the prechamber housing, the prechamber volume being in fluid communication with the external surface of the prechamber housing and a main combustion chamber of the internal combustion engine via each passage; and
a cooling system configured to cool at least one of the first prechamber housing portion and the second prechamber housing portion, based on a flow of a cooling fluid through the cooling system, the cooling system comprising at least one cooling channel defined within the wall of the prechamber housing,
the at least one cooling channel including a loop portion that at least partially surrounds one passage of the plurality of passages about a circumferential direction of the one passage, the circumferential direction of each passage extending circumferentially about a flow direction through each passage,
the loop portion being configured to cool the one passage based on the flow of the cooling fluid through the cooling system,
wherein the at least one cooling channel includes a plurality of cooling channels, such that each cooling channel of the plurality of cooling channels uniquely corresponds to a passage of the plurality of passages.

* * * * *